United States Patent Office 3,305,553
Patented Feb. 21, 1967

---

3,305,553
2-AMINOQUINAZOLINE DERIVATIVES
Milton L. Hoefle and Ann Holmes, Ann Arbor, Mich., assignors to Parke, Davis & Company, Detroit, Mich., a corporation of Michigan
No Drawing. Filed Oct. 18, 1965, Ser. No. 497,473
6 Claims. (Cl. 260—256.4)

The present invention relates to new quinazoline compounds and to methods for their production. More particularly, the invention relates to new 2-aminoquinazoline compounds, having the formula,

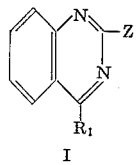

I and to pharmaceutically-acceptable salts thereof; where Z is $NH_2$, NH-lower alkyl, cyclohexylamino, piperidino, 4-methylpiperidino, hexamethyleneimino, 4-methylpiperazinyl, or 3-azabicyclo[3.2.2]non-3-yl; and $R_1$ is cyclohexyl or an aryl radical, having the formula

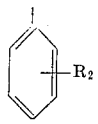

where $R_2$ is hydrogen, lower alkyl of not more than 4 carbon atoms, or halogen. When $R_2$ is lower alkyl, it is preferably methyl; when $R_2$ is halogen, it is preferably chlorine or bromine. When Z is NH-lower alkyl, the lower alkyl radical is one having not more than 4 carbon atoms.

In accordance with the invention, 2-aminoquinazoline compounds having Formula I are produced by reacting a 2-haloquinazoline compound, having the formula,

II with an amine compound, having the formula,

Z—H

III where $R_1$ and Z have the aforementioned significance, and X is halogen, preferably chlorine. The reaction is preferably carried out in the presence of a large excess of the amine reactant at the reflux temperature of the reaction mixture for a period that may vary from several minutes to an hour or more. Under these conditions, the hydrogen halide that is liberated is absorbed by the excess amine present, and the product is isolated as the free base having Formula I above. The reaction may also be carried out in a non-reactive solvent, in which case equivalent amounts of reactants may be used. Suitable solvents for this purpose are lower alkanols, aromatic hydrocarbons, chlorinated hydrocarbons, ethers, tertiary amides, and dimethylsulfoxide. The temperature and duration of the reaction are not critical; while the reflux temperature and a period of from several minutes to an hour are preferred conditions, other temperatures and times that may vary widely from these may also satisfactorily be employed. When the amine reactant employed is highly volatile, such as is ammonia, the reaction is best accomplished under elevated pressure in a sealed reaction vessel at a temperature between about 75° and 200° C.

The 2-haloquinazoline compounds, having Formula II above, that are used as starting materials in the foregoing process, can be prepared in different ways, as will appear in greater detail hereinafter. The 4-aryl-2-chloro quinazoline compounds, for example, having the formula.

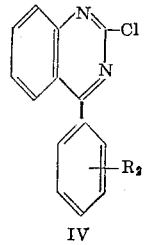

IV are prepared by reaction of a 2-aminobenzophenone compound, having the formula,

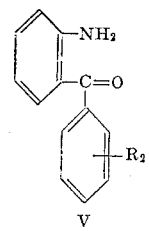

V with excess urea, followed by reaction of the 4-aryl-2-hydroxyquinazoline product, having the formula,

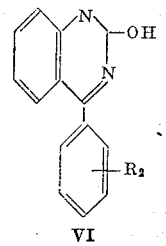

VI with phosphorus oxychloride; where $R_2$ has the same meaning as previously given. Other 2-chloroquinazoline compounds, including 2-chloro-4-cyclohexylquinazoline, can be prepared by reacting an enamine of cyclohexanone, for example, morpholinocyclohexene, with an acid chloride, having the formula,

VII followed by hydrolysis of the enamine, to give an acylated cyclohexanone compound, having the formula,

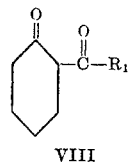

VIII reacting this intermediate with urea in an acidic medium to give a 2-hydroxy-5,6,7,8-tetrahydroquinazoline compound, having the formula,

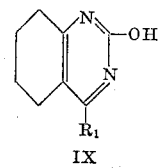

IX dehydrogenating this tetrahydroquinazoline intermediate by reaction with palladium on charcoal in the presence of nitrobenzene, and, finally, reacting the 2-hydroxyquinazoline compound obtained, having the formula,

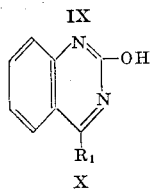

with phosphorus oxychloride to give the desired 2-chloroquinazoline starting material. In Formulas VII, VIII, IX and X, $R_1$ has the same meaning as earlier given.

Also in accordance with the invention, 2-aminoquinazoline compounds having Formula I above are produced by catalytically dehydrogenating a 2-amino-5,6,7,8-tetrahydroquinazoline compound, having the formula,

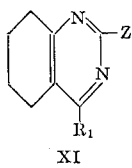

where $R_1$ and Z have the aforementioned significance. The reaction is best carried out in a high-boiling organic solvent in the presence of an equivalent amount of nitrobenzene, which acts as a hydrogen acceptor. Suitable high-boiling solvents are xylene, mesitylene, p-cymene, naphthalene, and α-methylnaphthalene; of these, xylene is preferred. A number of catalysts may be used, including palladium on charcoal, sulfur, selenium, and platinum. Palladium on charcoal gives best results and is preferred. The amount of catalyst is not critical. The reaction is most advantageously carried out at the reflux temperature of the reaction mixture under a water separator. The completion of the reaction can then conveniently be determined from the amount of water collected.

The 2-amino-5,6,7,8-tetrahydroquinazoline compounds used as starting materials in the foregoing process are prepared by reacting a 2-hydroxy-5,6,7,8-tetrahydroquinazoline compound, having Formula IX above, with phosphorus oxychloride, and then reacting the 2-chloro-5,6,7,8-tetrahydroquinazoline product, having the formula,

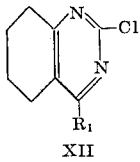

with an amine, having Formula III above; where $R_1$ and Z have the same meaning as previously given.

The 2-aminoquinazoline free base compounds of the invention form acid-addition salts with a variety of inorganic and organic acids. Pharmaceutically-acceptable salts are formed by the reaction of the free base with an acid such as hydrochloric, hydrobromic, hydriodic, nitric, sulfuric, phosphoric, acetic, benzoic, oxalic, citric, tartaric, maleic, succinic, benzenesulfonic, and related acids. The salt formation is suitably carried out by reacting the selected base with the selected acid in an unreactive solvent. The acid-addition salts can be converted to the free bases by reaction with a base such as an alkali metal hydroxide or an alkali metal carbonate. The free bases and acid-addition salts are equivalent for purposes of the invention.

The compounds of the invention are new chemical compounds that are useful as pharmacological agents. They are anti-inflammatory agents that can be used in the relief of inflammatory conditions as well as in the prevention or suppression of the occurrence of inflammation.

Certain of the compounds of the invention also exhibit analgetic activity and anti-allergic activity. Their anti-allergic activity is demonstrated by their antagonism toward bradykinin. This effect is observed as a suppression of the bronchoconstriction produced by bradykinin in laboratory animals, especially in guinea pigs. The compounds of the invention are preferably administered by the oral route. They can be combined with either a solid or liquid carrier or diluent and made available in varying amounts in such pharmaceutical forms as tablets, capsules, powders and aqueous and non-aqueous suspensions and solutions.

The preferred compounds of the invention, because they exhibit a high degree of anti-inflammatory activity and also possess analgetic activity and anti-allergic activity, are 2-(4-methyl-1-piperazinyl)-4-phenylquinazoline and pharmaceutically-acceptable acid-addition salts thereof.

The invention is illustrated by the following examples:

*Example 1*

A mixture of 12.0 g. of 2-chloro-4-phenylquinazoline and 150 ml. of saturated ethanolic ammonia solution is heated at 140° C. for 6 hours in a sealed reaction vessel. After cooling, the mixture is filtered and the solid 2-amino-4-phenylquinazoline that is isolated is crystallized from ethanol; M.P. 169–170° C.

*Example 2*

A mixture consisting of 12.02 g. of 2-chloro-4-phenylquinazoline, 8.5 g. of piperidine, and 125 ml. of benzene is stirred at room temperature for several hours, then heated to the boiling point for a few minutes, cooled, and treated with an equal volume of ether. The solid 4-phenyl-2-piperidinoquinazoline that precipitates is isolated and purified, first by distillation, with the fraction distilling at 182–184° C./0.45 mm. Hg being collected, and then by crystallization from ethanol; M.P. 99–100° C.

The hydrochloride salt of 4-phenyl-2-piperidinoquinazoline is prepared by treating a solution of 2.89 g. of the free base in 50 ml. of ethanol with gaseous hydrogen chloride for 30 seconds, cooling the mixture, and isolating and washing well with ether the yellow solid obtained; M.P. 226–228° C.

The oxalate salt of 4-phenyl-2-piperidinoquinazoline is obtained by heating a mixture of 2.89 g. of the free base and 1.26 g. of oxalic acid in 50 ml. of ethanol to the boiling point for 5 minutes, cooling the mixture, and isolating and washing well with ether the yellow solid obtained; M.P. 152–153° C.

*Example 3*

2-chloro-4-phenylquinazoline (48.1 g.) is stirred at room temperature with 130 ml. of N-methylpiperazine until the initial exothermic reaction has subsided, and the mixture is then stirred and heated for 30 minutes more under reflux. After cooling, an equal volume of cold water is added, and the 2-(4-methyl-1-piperazinyl)-4-phenylquinazoline that precipitates is isolated and crystallized from 50% ethanol; M.P. 101–102° C.

The hydrochloride salt of 2-(4-methyl-1-piperazinyl)-4-phenylquinazoline is prepared by treating a solution of 3.0 g. of the free base in 50 ml. of ethanol with dry hydrogen chloride for 30 seconds, cooling the resulting mixture, and isolating and washing well with ether the solid obtained.

*Example 4*

2-chloro-4-phenylquinazoline (4.8 g.) is stirred with 30 ml. of 4-methylpiperidine until the initial exothermic reaction has subsided and the temperature has dropped below 100° C. The mixture is then heated under reflux for 5–10 minutes, cooled, and treated with an equal volume of water. The 2-(4-methylpiperidino)-4-phenylquinazoline that precipitates is isolated and crystallized from isopropyl ether; M.P. 84–85° C.

By utilizing the foregoing procedure, the following 2-amino-4-arylquinazoline compounds are obtained from the reaction of the designated reactants:

(a) From the reaction of 10 g. of 2-chloro-4-phenylquinazoline and 30 ml. of hexamethyleneimine there is obtained -2(hexahydro-1H-azepin-1-yl)-4-phenylquinazoline; M.P. 98–99° C., following crystallization from 50% ethanol.

(b) From the reaction of 12.7 g. of 2-chloro-4-(p-tolyl)quinazoline and 30 ml. of piperidine there is obtained 2-piperidino-4-(p-tolyl)quinazoline; M.P. 82–84° C., following crystallization from 50% ethanol.

(c) From the reaction of 12.7 g. of 2-chloro-4-(o-tolyl)quinazoline and 30 ml. of N-methylpiperazine there is obtained 2-(4-methyl-1-piperazinyl)-4-(o-tolyl)-quinazoline; M.P. 100–102° C., following crystallization from aqueous ethanol.

(d) From the reaction of 10 g. of 2-chloro-4-phenylquinazoline and 25 ml. of 3-azabicyclo[3.2.2]nonane there is obtained 2-(3-azabicyclo[3.2.2]non-3-yl)-4-phenylquinazoline; M.P. 105–106° C., following crystallization from aqueous ethanol.

(e) From the reaction of 10 g. of 2-chloro-4-(o-ethylphenyl)quinazoline and 30 ml. of N-methylpiperazine there is obtained 2-(4-methyl-1-piperazinyl)-4-(o-ethylphenyl)quinazoline.

The 2-chloro-4-(o-ethylphenyl)quinazoline used as a starting material in (e) above is prepared starting from morpholinocyclohexene and o-ethylbenzoyl chloride according to the procedure described in Example 5 for the preparation of 2-chloro-4-cyclohexylquinazoline.

*Example 5*

A mixture of 6.2 g. of 2-chloro-4-cyclohexylquinazoline and 30 ml. of N-methylpiperazine is heated under reflux for 10 minutes, cooled, and treated with an equal volume of water. The 2-(4-methylpiperazinyl)-4-cyclohexylquinazoline that precipitates is isolated and crystallized from ethanol; M.P. 74–75° C.

The 2-chloro-4-cyclohexylquinazoline used as a starting material in the foregoing procedure is prepared as follows. To a stirred solution of 121.9 g. of morpholinocyclohexene and 73.8 g. of triethylamine in 500 ml. chloroform is slowly added a solution of 107.1 g. of cyclohexylcarbonyl chloride in 400 ml. of chloroform while the temperature is kept at 35–40° C. and the resulting mixture is stirred at room temperature for 8–16 hours. Hydrochloric acid (20%; 500 ml.) is added and the resulting mixture is heated under reflux with continued stirring for five hours. Upon cooling, the organic phase is separated, and the aqueous phase is extracted with chloroform. The chloroform extracts and organic phase are combined, dried, concentrated to near-dryness and distilled under reduced pressure to give 2-oxocyclohexyl cyclohexyl ketone; B.P. 115–120° C./10.35 mm. Hg. A mixture of 79.3 g. of 2-oxocyclohexyl cyclohexyl ketone, 23.1 g. of urea, and 150 ml. of glacial acetic acid is heated under reflux for 6 hours while hydrogen chloride is bubbled in. After cooling, the mixture is poured into an equal volume of water, and the aqueous solution is neutralized with sodium hydroxide, cooled, and filtered. The 2-hydroxy-4-cyclohexyl-5,6,7,8-tetrahydroquinazoline that is isolated is crystallized from 50% ethanol; M.P. 209–210° C.

A mixture of 12 g. of 2-hydroxy-4-cyclohexyl-5,6,7,8-tetrahydroquinazoline, 12.65 g. of nitrobenzene, 5 g. of 20% palladium on charcoal, and 100 ml. of xylene is heated under reflux under a water separator for several hours or until the theoretical amount of water is collected. The catalyst is removed from the hot solution by filtration and washed well with ethanol. The combined filtrate and washings are concentrated to near-dryness, and the residue is triturated with ether to give 2-hydroxy-4-cyclohexylquinazoline; M.P. 214–215° C., following crystallization from ethanol. A mixture of 11.2 g. of 2-hydroxy-4-cyclohexylquinazoline and 60 ml. of phosphorus oxychloride is heated under reflux for several hours and then concentrated to near-dryness. The residue is poured into ice-water, and the aqueous mixture is made basic with concentrated ammonium hydroxide. The precipitated semi-solid is isolated and dissolved in ether and the ethereal solution is dried and evaporated to dryness to give 2-chloro-4-cyclohexylquinazoline, suitable for use without further purification.

*Example 6*

2-chloro-4-(p-bromophenyl)quinazoline (56.8 g.) is stirred at room temperature with 130 ml. of N-methylpiperazine until the initial exothermic reaction has subsided, and the mixture is then stirred and heated for 30 minutes more under reflux. After cooling, an equal volume of cold water is added and the 2-(4-methyl-1-piperazinyl)-4-(p-bromophenyl)quinazoline that precipitates is isolated and crystallized from 50% ethanol.

In a similar manner, from the reaction of 55.0 g. of 2-chloro-4-(o-chlorophenyl)quinazoline and 100 ml. of piperidine there is obtained 2-piperidino-4-(o-chlorophenyl)quinazoline.

The starting materials are prepared as follows. A mixture of 82.8 g. of 2-amino-4'-bromobenzophenone and 100 g. of urea is heated at about 200° C. for 20–40 minutes or until the mass solidifies. After cooling, the solid is extracted with water and the water-insoluble residue is dissolved in hot 10% aqueous sodium hydroxide. The hot alkaline solution is filtered and the filtrate is acidified with concentrated hydrochloric acid. The solid 2-hydroxy-4-(p-bromophenyl)quinazoline that precipitates is isolated, washed with water, dried, and crystallized from ethanol. A mixture of 75.3 g. of 2-hydroxy-4-(p-bromophenyl)quinazoline and 250 ml. of phosphorus oxychloride is heated under reflux for several hours and then concentrated to near-dryness. The residue is poured into ice-water, and the aqueous mixture is made basic with concentrated ammonium hydroxide. The precipitated semi-solid is isolated and dissolved in ether and the ethereal solution is dried and evaporated to dryness to give 2-chloro-4-(p-bromophenyl)-quinazoline, suitable for use without further purification.

2-hydroxy-4-(o-chlorophenyl)quinazoline and 2-chloro-4-(o-chlorophenyl)quinazoline are prepared in a similar manner starting from the reaction of 2-amino-2'-chlorobenzophenone and excess urea.

*Example 7*

A mixture consisting of 12.0 g. of 2-chloro-4-phenylquinazoline, 20 ml. of n-propylamine, and 100 ml. of ethanol is heated at 140° C. for 6 hours in a sealed reaction vessel, concentrated to near-dryness under reduced pressure, and the residue treated with water. The aqueous mixture is cooled, and the solid 2-n-propylamino-4-phenylquinazoline that precipitates is isolated and crystallized from 50% aqueous ethanol; M.P. 90–92° C.

By utilizing the foregoing procedure, with the substitution of 25 ml. of ethylamine for the n-propylamine, there is obtained 2-ethylamino-4-phenylquinazoline.

*Example 8*

A mixture consisting of 12.0 g. of 2-chloro-4-phenylquinazoline, 10 g. of cyclohexylamine, and 100 ml. of ethanol is heated at 140° C. in a sealed reaction vessel, concentrated to near-dryness under reduced pressure, and the residue treated with water. The gummy solid obtained is isolated and triturated with concentrated hydrochloric acid. The acidic mixture is diluted with a small amount of water, and the solid 2-cyclohexylamino-4-phenylquinazoline hydrochloride that precipitates is isolated, dried, and crystallized from ethyl acetate; M.P. 184–185° C.

Example 9

A mixture of 35.7 g. of 4-phenyl-2-piperidino-5,6,7,8-tetrahydroquinazoline, 27.05 g. of nitrobenzene, 3 g. of 20% palladium on charcoal, and 200 ml. of xylene is heated under reflux under a water separator for several hours or until the theoretical amount of water is collected. The catalyst is removed from the hot solution by filtration and washed well with ethanol. The combined filtrate and washings are concentrated to near-dryness and the residue is triturated with ether to give 4-phenyl-2-piperidinoquinazoline; M.P. 99–100° C., following crystallization from ethanol.

In a similar manner, 2-(4-methyl-1-piperazinyl)-4-phenylquinazoline, M.P. 101–102° C., is obtained starting from 2-(4-methyl-1-piperazinyl)-4-phenyl-5,6,7,8-tetrahydroquinazoline.

The 4-phenyl-2-piperidino-5,6,7,8-tetrahydroquinazoline used as a starting material in the foregoing procedure is prepared as follows. A mixture of 35.3 g. of 2-benzoylcyclohexanone, 10.46 g. of urea, and 100 ml. of glacial acetic acid is heated under reflux for 6 hours while hydrogen chloride is bubbled in. The cooled mixture is poured into water, the aqueous solution is neutralized with 10% aqueous sodium hydroxide, and the solid 2-hydroxy-4-phenyl-5,6,7,8-tetrahydroquinazoline that separates is isolated, washed with water, dried, and crystallized from ethanol; M.P. 258–259° C. A mixture of 11.2 g. of 2-hydroxy-4-phenyl-5,6,7,8-tetrahydroquinazoline and 60 ml. of phosphorus oxychloride is heated under reflux for several hours and then concentrated to near-dryness. The residue is poured into ice-water, and the aqueous mixture is made basic with concentrated ammonium hydroxide. The 2-chloro-4-phenyl-5,6,7,8-tetrahydroquinazoline that separates on standing is isolated and crystallized from ethanol; M.P. 90–92° C. A mixture of 8.5 g. of 2-chloro-4-phenyl-5,6,7,8-tetrahydroquinazoline and 12 ml. of piperidine is heated under reflux for 10 minutes. Upon cooling, the mixture is poured into water, and the 4-phenyl-2-piperidino-5,6,7,8-tetrahydroquinazoline that separates and solidifies on standing is isolated and crystallized from isopropyl ether; M.P. 112–113° C.

2-(4-methyl-1-piperazinyl)-4-phenyl - 5,6,7,8 - tetrahydroquinazoline is prepared in a similar manner by reacting 2-chloro-4-phenyl-5,6,7,8 - tetrahydroquinazoline with N-methylpiperazine in the last step described above.

We claim:

1. A member of the class consisting of 2-aminoquinazoline compounds having the formula

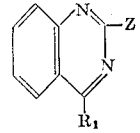

and pharmaceutically-acceptable acid-addition salts thereof; where Z is a member of the class consisting of $NH_2$, NH-lower alkyl, cyclohexylamino, piperidino, 4-methylpiperidino, hexamethyleneimino, 4-methylpiperazinyl, and 3-azabicyclo-[3.2.2]non-3-yl; and $R_1$ is a member of the class consisting of cyclohexyl and an aryl radical having the formula

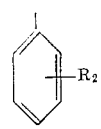

where $R_2$ is a member of the class consisting of hydrogen, lower alkyl, and halogen.

2. 2-(4-methyl-1-piperazinyl)-4-phenylquinazoline.
3. 4-phenyl-2-piperidinoquinazoline.
4. 2-(4-methylpiperidino)-4-phenylquinazoline.
5. 2-(hexahydro-1H-azepin-1-yl)-4-phenylquinazoline.
6. 2-(4-methyl-1-piperazinyl)-4-(o-tolyl)quinazoline.

References Cited by the Examiner

UNITED STATES PATENTS 2,945,859   7/1960   Hitchings et al. _____ 260—256.4

OTHER REFERENCES

Burnett et al., Jour. Org. Chem., vol. 23, 1958, pp. 1382–1383.

ALEX MAZEL, *Primary Examiner.*

MARY U. O'BRIEN, *Assistant Examiner.*